| United States Patent [19] | [11] 3,803,076 |
|---|---|
| Schneider et al. | [45] Apr. 9, 1974 |

[54] RENDERING POLYAMIDE SHAPED ARTICLES READILY MOLD RELEASABLE

[75] Inventors: Johannes Schneider; Wolfgang Pungs, both of Troisdorf, Germany

[73] Assignee: Dynamit Nobel AG, Troisdorf, Germany

[22] Filed: July 6, 1971

[21] Appl. No.: 160,067

[30] Foreign Application Priority Data
July 6, 1970  Germany............................ 2033320

[52] U.S. Cl.......... 260/30.4 N, 260/78 R, 260/78 S, 260/78 SC, 264/170
[51] Int. Cl............................................ C08g 20/38
[58] Field of Search..... 260/78 R, 78 A, 78 L, 78 S, 260/78 SC, 30.4 N

[56] References Cited
UNITED STATES PATENTS

| | | | |
|---|---|---|---|
| 2,071,250 | 2/1937 | Carothers........................... | 260/78 R |
| 2,547,113 | 4/1951 | Drewitt et al...................... | 260/78 R |
| 3,538,058 | 11/1970 | Goodman et al. ................ | 260/78 R |
| 2,989,364 | 6/1961 | Goldann........................... | 260/78 SC |
| 3,363,027 | 1/1968 | Schnegg et al.................. | 260/78 SC |
| 3,578,614 | 5/1971 | Wszoler .......................... | 260/78 SC |
| 2,517,573 | 8/1950 | Jones et al. ..................... | 260/78 SC |
| 3,150,117 | 9/1964 | Gabler............................. | 260/78 R |

OTHER PUBLICATIONS

Chemical Abstracts, Vol. 75, 1971, p. 21857y; re Ger. Offen. 1,947,216

*Primary Examiner*—Harold D. Anderson
*Attorney, Agent, or Firm*—Burgess, Dinklage & Sprung

[57] ABSTRACT

Polyamides, removed from terephthalic acid or from the dimethylester of terephthalic acid and mixtures of 2,2,4- and 2,4,4-trimethylhexamethylene diamine, sometimes adhere to the mold when injection molded. The tendency is overcome by mixing the polyamide with about 0.1 to 6 percent by weight of a lactone of three to nine carbon atoms, melting the mixture and forming it into a shaped article. The physical properties of the article are unimpaired as a result of the addition. The lactones of hydroxyfatty acids are preferred.

6 Claims, No Drawings

RENDERING POLYAMIDE SHAPED ARTICLES READILY MOLD RELEASABLE

The present invention relates to rendering polyamide shaped articles readily releasable from the mold in which they were shaped.

Amorphous polyamides of high stability of shape and rigidity upon exposure to heat have been made from diamines and aromatic dicarboxylic acids, especially terephthalic acid, or monoalkyl, dialkyl or diaryl esters thereof. They are characterized by high tensile strength and even in the form of thick-walled cast or molded products they have a clear glassy appearance which is not altered even by long periods of exposure to elevated temperatures. Because of their low and unvarying shrinkage in fabrication and their low thermal expansion coefficients, plus their desirable permeability to gases, they are therefore especially suitable for the manufacture of hard, tough, pressure-resistant, transparent and dimensionally stable molded and cast products, such as filter cups and filter bowls, housings for circuit breakers and electric meters, safety masks for TV picture tubes, gears, racks and null switch levers, switch buttons, pilot light covers, developer stations for electrostatic photocopying apparatus and oil level indicators, as well as stock materials in sheet and solid rod form.

Aliphatic dicarboxylic acids can also be used in the manufacture of polyamides.

As regards the diamine components, straight-chain or alkyl-substituted aliphatic diamines form the basis of the polyamides of the prior art, examples being hexa-, nona- or decamethylenediamine, 2-methyl-4-ethylhexamethylenediamine, 2,2,5,5-tetramethylhexamethylenediamine, 3-isopropylhexamethylenediamine, 3-isooctylhexamethylenediamine, 3-isododecylhexamethylenediamine, 2,4-diethyloctamethylenediamine, 2,2,4-trimethylhexamethylenediamine, 2,4,4-trimethylhexamethylenediamine, or cyclic diamines such as 3-aminomethyl-3,5,5-trimethylcyclohexylamine, and the like. Also used are diamines of the general formula

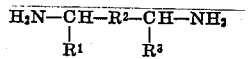

in which $R^1$ represents hydrogen or an alkyl radical with 1 to 4 carbon atoms, $R^2$ represents an alkyl-substituted or unsubstituted alkylene radical with one to 10 carbon atoms in the chain or an alkyl-substituted or unsubstituted phenylene radical, and $R^3$ represents an alkyl radical with one to four carbon atoms, examples being 1,3-diaminobutane, 2,5-diamino-3,4-dimethylhexane, 1,5-diamino-4-isopropylhexane, 2,7-diamino-4-methyloctane, 3,5-diaminoheptane; 1,7-diamino-4,4-dimethyloctane, 1,7-diamino-4,4,6-trimethyloctane, 1,7-diamino-4,4,8-trimethylnonane or $\alpha,\alpha'$-diamino-1,3-diethylbenzene. Aromatic diamines, such as phenylenediamine or xylylenediamine, are also used.

The following, for example, can be used as dicarboxylic acid components for the preparation of the polyamides: aliphatic dicarboxylic acids such as adipic and sebacic acid, and aromatic dicarboxylic acids such as terephthalic acid, isophthalic acid or naphthalene dicarboxylic acid.

Fundamentally, these polyamides can be made by any of the processes commonly used for the preparation of polyamides of the prior art containing dicarboxylic acid radicals and diamine radicals. For example, the aqueous, concentrated solution of the salt prepared from the dicarboxylic acid and a diamine can be polycondensed, at first under pressure, and then with the pressure relieved, at temperatures up to about 280°C in the melt. The pressure stage can be circumvented by preliminary condensation of the salt in high-boiling solvents such as cresols, and the application of a vacuum in the final stage of the polycondensation.

Also, lower alkyl esters of the dicarboxylic acids can be reacted with virtually equimolecular amounts of diamine in the presence of water, forming alcohol as a by-product, and the principal product can be polycondensed like an aqueous salt solution. Instead of lower alkyl esters, diaryl esters of the dicarboxylic acids can be used as the starting material, and in this case the use of water can be eliminated. Lastly, it is also possible to react dihalides of the dicarboxylic acids at normal temperature with virtually equimolecular quantities of the diamine in the presence of basically acting compounds, by solution condensation or by interfacial condensation. With regard to the above-mentioned polyamides and their preparation, see, for example, U.S. Pat. No. 3,150,117, British Pat. No. 1,049,987 and Belgian Pat. No. 723,154.

In working molding compositions comprising the above-described polyamides by injection molding or pressing, however, difficulties often occur in that the transparent products manufactured exhibit an undesirable adhesiveness which makes it difficult to strip them from the mold thus preventing continuous production.

Attempts have been made to obviate this adhesiveness by the use of fluid or easily-melting surface agents, such as talcum, hard paraffin, fatty acid derivatives, silicone oils or Teflon-base fluorocarbon sprays.

Also, a variety of operating conditions designed to eliminate the adhesion have been tried.

These methods and procedures have proven unsuitable, however, since they are accompanied by undesired side-effects; for example, the result of one variation of the operating conditions has been that there is no assurance of perfect filling of the mold. It has furthermore been observed that, when the above-mentioned mold release agents are used, flaws and incrustations occur in the finished product with the result that the optical quality of the product fails to meet practical requirements.

It is accordingly an object of the invention to provide means for forming such polyamide compositions into transparent shaped structures which will readily separate from the shaping devices so as not to form blemishes.

This is realized in accordance with the present invention wherein there is incorporated into the polyamide composition which is to be melted and extruded certain lactones in predetermined amount. In addition to the novel composition which can be shaped, the invention also extends to a novel shaping process for the manufacture of non-sticking shaped articles from molding compositions containing radicals of aromatic or aliphatic dicarboxylic acids and radicals of aromatic or aliphatic diamines, which is characterized by the fact that the molding compositions contain about 0.1 to 6%, preferably about 1 to 2% by weight, of a lactone having three to nine carbon atoms. Examples of suitable lactones include β-propiolactone, γ-butyrolactone, γ-valerolactone, ε-caprolactone, γ-caprolactone, γ,γ-dimethyl-γ valerolactone, and the lactone of 0-hydroxymethylphenyl acetic acid. The preferred lactones are those containing three to five ring carbon atoms, the lactones comprising cyclic esters of hydroxyfatty acids and especially monohydroxyalkanoic acids.

The novel compositions can be formed into thick-walled, highly transparent articles of high impact strength. It is especially to be stressed that the addition of these lactones in quantities of up to about 2% by weight results in an improved notch impact toughness, without adversely affecting the other mechanical properties of the amorphous polyamides, such as tensile strength, ball pressure hardness and modulus of elasticity. In addition it has surprisingly been found that those molding compositions which contain up to about 1% by weight of the lactones exhibit desirable anti-static properties, i.e., their surface resistance is greatly diminished. For complete anti-staticity a surface resistance of no more than about $3 \cdot 10^8$ ohms is normally required. It has been found, however, that in the case of objects made from the novel, lactone-containing transparent polyamides, slightly higher resistances are possible without the attraction of dust.

The additives are generally incorporated by mixing them with the polycondensates which are in powder, bead or granular form by means of a high speed mixer and then compounding by means of a screw-type unit. The molding compositions prepared in this manner can be fabricated without difficulty on injection molding and extruding machines and can be stripped from the molds with great ease.

Table 1 lists the results of tests run on compression and injection moldings made from known polycondensates.

TABLE 1

| Properties | DIN STANDARD | Polyamides Prepared From | | |
| --- | --- | --- | --- | --- |
| | | T + TMD | DMT + TMD | T + D7,3 |
| Viscosity Number* | 53,727 | 112-116 | 140 | 126 |
| Tensile Strength, kp/cm$^2$ | 53,455 | 850 | 850 | 840 |
| Modulus of Elasticity, kp/cm$^2$ | Flexing Test | 29,000 | 29,000 | 26,000 |
| Ball Pressure Hardness after 60 seconds, kp/cm$^2$ | 53,456 | 1400 | 1400 | 1300 |
| Electrical Surface Resistance after 24 hours in water, ohms | 53,482 | $1 \cdot 10^{13}$ | $1 \cdot 10^{13}$ | $1 \cdot 10^{13}$ |
| Behavior on stripping from the mold | | Adheres strongly to mold | Hard to remove from mold | Adheres strongly to mold |

*Measured on 0.5 wt % solution in m-cresol at 25°C
T = Terephthalic acid
TMD = 2,2,4- / 2,4,4-trimethylhexamethylenediamine
DMT = Dimethyl ester of terephthalic acid
D7,3 = 4,4-dimethyl-1,7-diaminooctane

EXAMPLE 1

The compounding of a polyamide of terephthalic acid and 2,2,4- and/or 2,4,4-trimethylhexamethylenediamine (viscosity range from 92 to 116) with 1% δ-valerolactone is performed first by the intimate mixing of the granulate or powder by means of a high speed mixer. The compounding of this mixture is then completed in the molten state by means of a dual screw extruding machine (Alpine DL 60) under the following conditions.

Temperature Control

| | |
| --- | --- |
| Zone 1 - Entrance | 250°C |
| Zone 2 | 275°C |
| Zone 3 | 275°C |
| Zone 4 | 270°C |
| Zone 5 | 265°C |
| Screw speed | 16 rpm |
| Power input to screws | 27 A |

EXAMPLE 2

A polyamide prepared from the dimethyl ester of terephthalic acid and 2,2,4- and/or 2,4,4-trimethylhexamethylenediamine with a viscosity of 140 is wetted with 1 wt-% of γ-butyrolactone and then mixed in a high speed mixer. This mixture is then compounded in the molten state by means of a screw mixing unit under the conditions described in Example 1.

EXAMPLE 3

The procedure is the same as in Example 2, except that, instead of γ-butyrolactone, 1% of ε-caprolactone is used, and the mixture is compounded in the fused state at the following temperatures:

Temperature Control

| | |
| --- | --- |
| Zone 1 - Entrance | 250°C |
| Zone 2 | 270°C |
| Zone 3 | 270°C |
| Zone 4 | 265°C |
| Zone 5 | 265°C |
| Screw speed | 16 rpm |
| Power input to screws | 26 A |

EXAMPLE 4

A polyamide prepared from terephthalic acid and 4,4-di-methyl-1,7-diaminooctane with a viscosity of 126 is combined with 2 wt-% of γ-butyrolactone and, after thorough mixing in a high-speed turbulence mixer, is compounded under the following conditions in a screw mixing unit, as described in Example 1.

Temperature Control

| | |
| --- | --- |
| Zone 1 = Entrance | 260°C |
| Zone 2 | 280°C |
| Zone 3 | 280°C |
| Zone 4 | 270°C |
| Zone 5 | 265°C |
| Screw speed | 15 rpm |
| Power input to screws | 26 A |

EXAMPLE 5

A polyamide prepared from the dimethyl ester of terephthalic acid and 2,2,4- and/or 2,4,4-trimethylhexamethylene-diamine and having a viscosity number of 125 is mixed with 1 wt-% of γ,γ-dimethyl-δ-valerolactone and compounded in the fused state under the conditions described in Example 2.

EXAMPLE 6

A polyamide prepared from the dimethyl ester of terephthalic acid and 2,2,4- and/or 2,4,4-trimethylhexamethylene-diamine with a viscosity number of 130 is wetted with 6 wt-% of β-propiolactone and then thoroughly mixed in a high speed mixer. This mixture could no longer be compounded easily because of feeding difficulties resulting from the high content of lactone.

The molding compounds prepared in Examples 1 to 5 could be made into test specimens 4 mm thick at temperatures ranging from 240° to 280°C in plunger and screw type injection molding machines.

The testing of the behavior of the products in being stripped from the molds was performed by means of a test specimen designed for the purpose in the shape of a hollow truncated cone of the following dimensions:

| | |
|---|---|
| Height | 9.84 cm |
| Radius at bottom | 6.18 cm |
| Radius at top | 4.59 cm |
| Wall thickness | 1.5 cm |

Table 2 sets out the results achieved in making such moldings, the legends having the same meanings as in Table 1.

TABLE 2

| Properties | DIN STANDARD | T + TMD +1 wt % δ-valero lactone | DMT + TMD +1 wt % γ-butyro-lactone | DMT + TMD +1 wt % ε-capro-lactone | T + D7,3 +2 wt % γ-butyro-lactone | DMT + TMD +1 wt % γ,γ-di-methyl-δ-valero-lactone |
|---|---|---|---|---|---|---|
| Tensile Strength, kp/cm² | 53,455 | 845 | 870 | 840 | 850 | 860 |
| Modulus of Elasticity, kp/cm² | Flexing test | 29,000 | 30,000 | 29,000 | 26,000 | 28,000 |
| Ball Pressure Hardness after 60 seconds, kp/cm² | 53,456 | 1,400 | 1,400 | 1,420 | 1,300 | 1,400 |
| Electrical Surface Resistance after 24 hours in water, ohms | 53,482 | 2·10¹⁰ | 1.6·10¹⁰ | 1.7·10¹⁰ | 2·10¹⁰ | 1.6·10¹⁰ |
| Behavior on stripping from the mold | | Strips well | Strips without difficulty | Strips well | Strips well | Strips very easily |

By comparison with Table 1 it can be seen that the stripping performance is markedly improved without impairing the physical properties and even with a reduction in the surface resistance which in turn will reduce the attraction of dust.

While not wishing to be bound thereby, it is believed the lactones open in the molten state and react with the polyamide, the carbonyl function of the lactone probably forming an amide with an amino group of the initial polyamide and the hydroxyl fucntion of the lactone probably forming an ester with a carboxyl group of the initial polyamide so that the end product is an interpolymer.

It will be appreciated that the instant specification and examples are set forth by way of illustration and not limitation and that various modifications and changes may be made without departing from the spirit and scope of the present invention.

What is claimed is:

1. A composition of matter consisting essentially of a normally solid polyamide of at least one dicarboxylic acid selected from the group consisting of terephthalic and isophthalic acids and at least one diamine selected from the group consisting of 2,2,4-trimethylhexamethylenediamine, 2,4,4-trimethylhexamethylenediamine and 1,7-diamino-4,4-dimethyloctane, and about 0.1 to 6% by weight of a lactone having three to nine carbon atoms, which lactone is a cyclic ester of a hydroxyfatty acid.

2. The composition according to claim 1 wherein said acid is terephthalic acid, isophthalic acid or mixtures thereof and said diamine is a mixture of 2,2,4- and 2,4,4-trimethylhexamethylenediamines.

3. The composition according to claim 1 wherein said lactone is present to the extent of about 1 to 2% by weight.

4. The process for making a composition suitable for melt extrusion into a shaped article, comprising mixing a normally solid polyamide of at least one dicarboxylic acid selected from the group consisting of terephthalic and isophthalic acids and at least one diamine selected from the group consisting of 2,2,4-trimethylhexamethylenediamine, 2,4,4-trimethylhexamethylenediamine and 1,7-diamino-4,4-dimethyloctane, with about 0.1 to 6% by weight of a lactone having three to nine carbon atoms, which lactone is a cyclic ester of a hydroxyfatty acid.

5. Process according to claim 4, wherein said lactone is present to the extent of about 1 to 2% by weight.

6. Process according to claim 4, wherein said acid is terephthalic acid, isophthalic acid or mixtures thereof and said diamine is a mixture of 2,2,4- and 2,4,4-trimethylhexamethylenediamines.

* * * * *